(No Model.)
F. H. BROWN.
MACHINE FOR ROLLING NUT BLANKS.
No. 333,106. Patented Dec. 29, 1885.
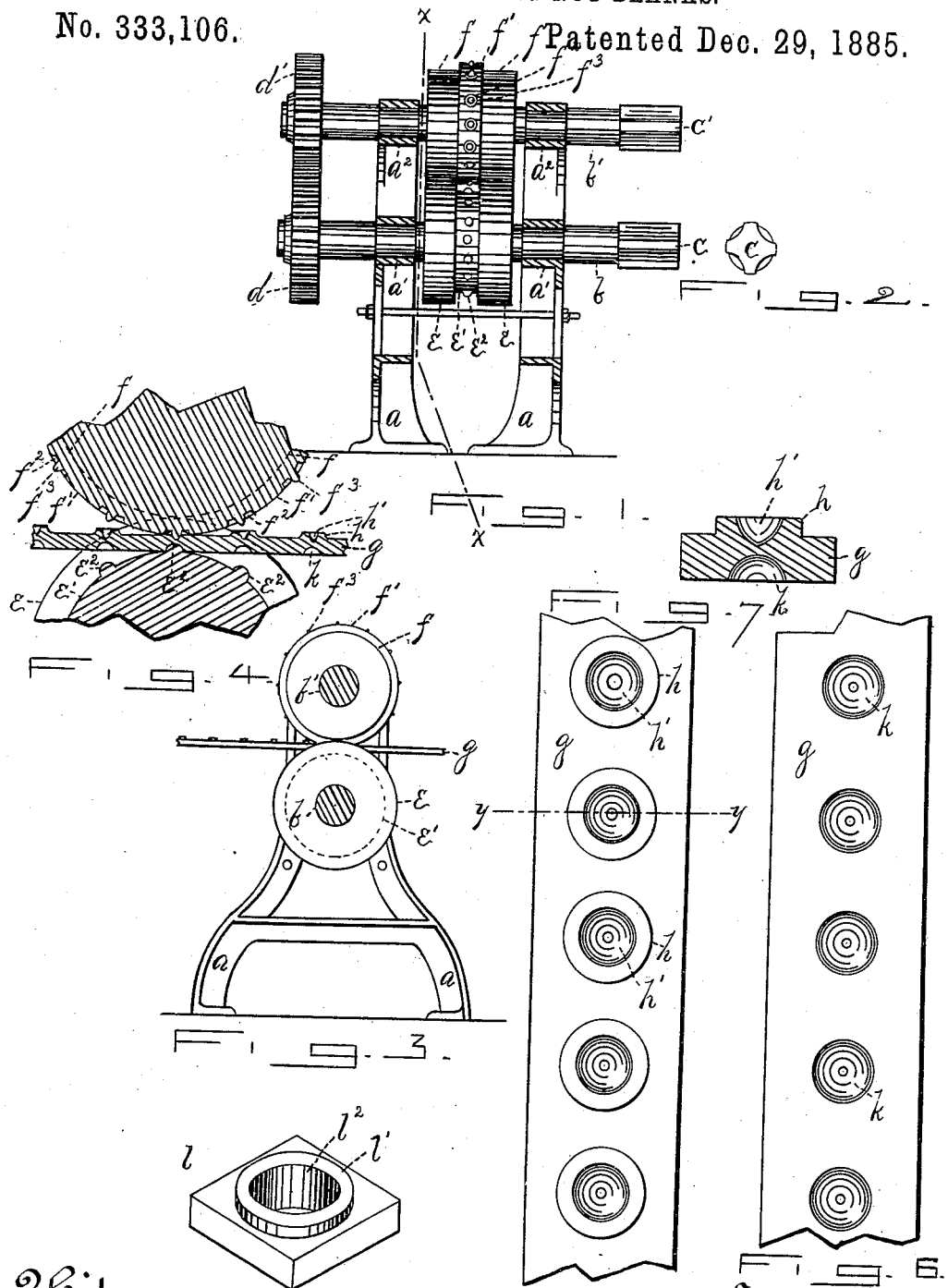
Witnesses:
Otto Hoddick
J. H. Marling
Inventor.
Frederick H. Brown
By W. T. Miller
Attorney

UNITED STATES PATENT OFFICE.

FREDERICK H. BROWN, OF BUFFALO, NEW YORK.

MACHINE FOR ROLLING NUT-BLANKS.

SPECIFICATION forming part of Letters Patent No. 333,106, dated December 29, 1885.

Application filed December 26, 1884. Serial No. 151,135. (No model.)

*To all whom it may concern:*

Be it known that I, FREDERICK H. BROWN, a citizen of the United States, residing at Buffalo, in the county of Erie and State of New York, have invented certain new and useful Improvements in the Manufacture of Nuts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in a certain apparatus for producing a nut having a raised annular shoulder on one face thereof and surrounding the screw-threaded orifice, all as will be more fully hereinafter described and claimed.

In the drawings, Figure 1 is a front view of a pair of my improved rolls. Fig. 2 is a detail view. Fig. 3 is a vertical section of Fig. 1, taken in the line $xx$. Fig. 4 is an enlarged fragmental section taken through the center of the rolls. Fig. 5 is a top plan view of the bar of iron after passing through my improved rolls. Fig. 6 is a bottom view of the same. Fig. 7 is a vertical transverse section of the same, taken through the line $y\,y$; and Fig. 8 is a perspective view of a nut formed from the bar shown in Figs. 4 and 5.

Referring to the drawings, $a$ is the framework in which the rolls are mounted. In this frame-work are the two sets of bearings $a'\,a'$ and $a^2\,a^2$.

In the bearings $a'\,a'$ is mounted the shaft $b$, and in the bearings $a^2\,a^2$ the shaft $b'$. One end of these shafts is provided with a clutch, $c$, an end view of which is shown in Fig. 2, by means of which a grip is obtained upon such shafts in the operation of turning them by any suitable power. The other ends of the shafts are provided with the cog-wheels $d\,d'$, which intermesh one with the other.

Between the bearings $a'\,a'$, and upon the shaft $b$, is rigidly secured a roll having the smooth end bearings, $e\,e$, of equal diameter and width, and the central depressed portion, $e'$, of smaller diameter, having arranged centrally around its circumference the series of semi-spherical or rounded bosses $e^2$.

Upon the shaft $b'$, and between the bearings $a^2\,a^2$, is mounted another roll having the smooth end bearings, $f\,f$, corresponding with the bearings $e\,e$ of the lower roll. These bearings $e\,e$ and $f\,f$ are so arranged that they have continual and close contact with each other in the revolution of the shafts $b$ and $b'$.

Between the bearings $f\,f$ of the upper roll is the raised cylindrical portion $f'$, of a width sufficient to pass closely within the depressed portion $e'$ of the lower roll, and around the circumference of this raised portion $f'$ are arranged a series of annular depressions, $f^2$, from the center of which rises the rounded or conical spur or boss $f^3$. These annular depressions $f^2$ and spurs or bosses $f^3$ register with the bosses $e^2$ upon the lower roll. Between these rolls, constructed as just described, and revolved by suitable power, is passed a bar of iron, $g$, as clearly shown in Fig. 4. During its transit between the rolls the bar has impressed upon its upper surface by the upper roll a series of annular shoulders, $h$, having in their centers the rounded or conical depressions $h'$. These are produced by the annular depressions $f^2$ and the bosses $f^3$ of the upper roll. On the under surface of the bar $g$, as it passes between the rolls, are produced the series of semi-spherical or rounded depressions $k$, registering with the annular shoulders $h$ and depressions $h'$ on the other side of the bar. The function of the bosses $e^2$ upon the under roll is to effect by their upward pressure a crowding of the metal of the bar into the annular depression $f^2$ of the upper roll, so as to produce thereby a perfect annular shoulder, $h$, upon the opposite side of the bar, it having been found in practice that it was impossible to form a perfect shoulder unless an upward pressure of the metal was thus effected during the transit of the bar between the rolls.

After the bar $g$ has been prepared in the manner just described it is placed under a suitable punch, which perforates the bar within the annular shoulder $h$, and cuts the same midway of these annular shoulders, producing the nuts $l$, as shown in Fig. 8, with their annular shoulders $l'$, which are to be screw-threaded to form the finished nuts.

The method of producing the nut herein claimed is reserved as subject-matter for another application.

I claim—

1. A pair of rolls for rolling iron to form nuts, upon one of which are arranged at intervals annular recesses with central raised bosses therein, the other roll having a corresponding number of bosses for forcing the metal into the annular recesses as the bar is passed between the rolls, all arranged and operating substantially as shown and described.

2. The combination, with the roll having the side bearing-surfaces, $e\ e$, the depressed central portion, $e'$, and the series of bosses $e^2$, of the roll having the side bearing-surfaces, $f\ f$, the raised central portion, $f'$, and the series of annular recesses $f^2$, and central raised bosses, $f^3$, the rolls being arranged and operating substantially as and for the purpose stated.

In testimony whereof I have signed my name to this specification in the presence of two subscribing witnesses.

FREDERICK H. BROWN.

Witnesses:
OTTO HODDICK,
W. T. MILLER.